US007760069B2

(12) United States Patent
Cayne et al.

(10) Patent No.: US 7,760,069 B2
(45) Date of Patent: *Jul. 20, 2010

(54) METHODS OF USING AN INTELLIGENT LOCKING SYSTEM

(75) Inventors: Jordan Cayne, Marlboro, NJ (US); Mark Adams, Ecclesmachan (GB); Colin MacAlpine, Kinross (GB); Robert Laidlaw, Edinburgh (GB); Laurence Thomas, Livingston (GB)

(73) Assignee: Typhoon Industries LLC, Marlboro, NJ (US)

( * ) Notice: Subject to any disclaimer, the term of this patent is extended or adjusted under 35 U.S.C. 154(b) by 37 days.

This patent is subject to a terminal disclaimer.

(21) Appl. No.: 11/490,697

(22) Filed: Jul. 21, 2006

(65) Prior Publication Data

US 2006/0255905 A1 Nov. 16, 2006

Related U.S. Application Data

(63) Continuation of application No. 10/959,339, filed on Oct. 5, 2004, now Pat. No. 7,113,071, which is a continuation of application No. 09/896,595, filed on Jun. 29, 2001, now Pat. No. 6,806,807.

(60) Provisional application No. 60/215,218, filed on Jun. 30, 2000.

(51) Int. Cl.
*G06K 19/00* (2006.01)

(52) U.S. Cl. .................... 340/5.22; 340/5.73; 340/5.82; 340/825.29

(58) Field of Classification Search ................ 340/5.22, 340/5.52, 5.73, 825.29, 5.82; 382/124, 115, 382/125; 700/241, 242, 17; 235/382
See application file for complete search history.

(56) References Cited

U.S. PATENT DOCUMENTS

| | | | |
|---|---|---|---|
| 5,126,732 | A | 6/1992 | Mardon |
| 5,172,970 | A | 12/1992 | Momose et al. |
| 5,223,829 | A | 6/1993 | Watabe |
| 5,231,272 | A | 7/1993 | Mardon |
| 5,894,277 | A | 4/1999 | Keskin et al. |

(Continued)

OTHER PUBLICATIONS

US District Court for the District of New Jersey, Civil Action No. 06-00274 (JCL)(MF). *SL Technology, Inc. and Typhoon Industries LLC* vs. *Smarte Carte Corporation and Smarte Carte, Inc.*

*Primary Examiner*—Vernal U Brown
(74) *Attorney, Agent, or Firm*—Lerner, David, Littenberg, Krumholz & Mentlik, LLP

(57) ABSTRACT

A method of using an electronic locking system to access one of a plurality of lockers includes programming the electronic locking system by recording at least one biometric characteristic of a user when the user is located at the plurality of lockers, and associating the recorded at least one biometric characteristic of the user with the one of a plurality of lockers so that the user is authorized to access the one of a plurality of lockers. The method includes re-recording the at least one biometric characteristic of the user and comparing the re-recorded at least one biometric characteristic of the user with the recorded at least one biometric characteristic of the user, and unlocking the one of a plurality of lockers if the re-recorded at least one biometric characteristic of the user matches the recorded at least one biometric characteristic of the user.

24 Claims, 7 Drawing Sheets

U.S. PATENT DOCUMENTS

| | | | | |
|---|---|---|---|---|
| 5,946,660 | A | 8/1999 | McCarty et al. | |
| 5,959,541 | A | 9/1999 | DiMaria et al. | |
| 5,995,014 | A | 11/1999 | DiMaria | |
| 6,018,739 | A * | 1/2000 | McCoy et al. | 707/102 |
| 6,068,305 | A | 5/2000 | Myers et al. | |
| 6,344,796 | B1 | 2/2002 | Ogilvie et al. | |
| 6,426,699 | B1 | 7/2002 | Porter | |
| 6,501,846 | B1 | 12/2002 | Dickinson et al. | |
| 6,688,435 | B1 * | 2/2004 | Will et al. | 186/35 |
| 6,696,918 | B2 | 2/2004 | Kucharczyk et al. | |
| 6,859,215 | B1 * | 2/2005 | Brown et al. | 715/811 |
| 6,980,672 | B2 | 12/2005 | Saito et al. | |

* cited by examiner

METHODS OF USING AN INTELLIGENT LOCKING SYSTEM

CROSS REFERENCE TO RELATED APPLICATIONS

The present application is a continuation of U.S. application Ser. No. 10/959,339, filed Oct. 5, 2004, now allowed, which is a continuation of U.S. application Ser. No. 09/896,595, filed Jun. 29, 2001, now U.S. Pat. No. 6,806,807, which claims benefit of U.S. Provisional Application No. 60/215,218 filed Jun. 30, 2000, the disclosures of which are hereby incorporated by reference herein.

FIELD OF THE INVENTION

The present invention is directed to a locking system for securing articles in lockable storage containers and is more particularly is directed to an electronic locking system that uses one or more microprocessors for identifying authorized users of the system, and for granting access to the one or more storage containers associated with each authorized user.

BRIEF DESCRIPTION OF THE PRIOR ART

Mechanical lockers are used in both concessional and non-concessional venues. In concessional venues, such as airports, bus and train stations, malls, theme parks and ski resorts, users must often pay to use the lockers. In non-concessional venues, such as schools and fitness centers, users are typically not required to pay to use the lockers. There are a number of problems associated with mechanical locking systems that require a user to pay to use the system. These problems include the fact that each locker may only accept a limited number of coins, and those coins are the only acceptable method of payment. As a result, a third party must collect the coins from the system and the vendor/owner cannot always account for the correct amount of cash. Another problem with mechanical lockers is that keys must be used to operate them. These keys are commonly lost or stolen, thereby creating maintenance and security problems.

There are a number of companies that currently supply products and services in the electronic locker industry. MORS Industries built the first electronic locker system in the 1970's for use in the French railway system. In the early 1990's, MORS Industries experienced problems and sold the electronic locker division to a Dutch company operating under the name Logibag SA. Logibag SA has had some success in both the United States and Europe, placing approximately 35,000 lockers worldwide. Although Logibag SA has a large number of lockers in place, its electronic lockers use out-dated technology, and each locker has a relatively high selling price of approximately $1,000-$1,200 per locker.

Another electronic locker system, called Loksafe, was originally designed by RAANND Systems of Scotland UK. Initially, Loksafe was a direct competitor of Logibag SA and together Loksafe and Logibag dominated the global market for over a decade. Because it proved to be a more reliable and better-engineered product, Loksafe won a number of major state railway contracts over Logibag. Although there are currently about 12,000 Loksafe lockers installed worldwide, Loksafe uses 1980's DOS-based programming and therefore has a limited ability to accept upgrades. Like Logibag, Loksafe has a high per unit cost and requires special maintenance and support. The average selling price of each Loksafe locker is approximately $900-$1,200.

KW Muller, one of the original coin-operated locker manufacturers, recently introduced an electronic locker system in an attempt to maintain a market share being taken by competitors Logibag and Loksafe. Although KW Muller uses PC based technology, its system has proven to be unreliable and difficult to use. KW Muller has a price of approximately $2,000-$2,500 per locker.

Another entrant in the electronic locker market is Eurolocker. The Eurolocker system has an unreliable electronic system. As a result, Eurolocker has enjoyed only limited success. The Eurolocker was revamped and relaunched by its new owner (Smarte Carte), and has achieved success in a number shopping malls and theme parks in the United States. This success is due almost entirely to the fact that Eurolocker's electronic units are not sold to third parties, but instead are placed on concession through Eurolocker's parent organization, Smarte Carte. In fact, there have been many negative responses to the quality of Eurolocker, and the system is unlikely to be used in any major terminals or similar locations. The estimated cost for each Eurolocker opening in the United States is approximately $2,00-$3,000 per locker.

Another competitor, American Locker Security Systems, is a global leader in the non-electronic locker industry. This United States-based company has dominated the market in the United States and in many overseas countries with its Statesman system. American Locker Security Systems realized that the locker market was moving to electronics and originally tried to modify its document storage system, Compulok, to meet this demand. However, this attempt failed. American Locker Security Systems then obtained the United States dealership for Loksafe, but achieved only marginal success due to the high price of the Loksafe units in the United States. Since then, American Locker Security Systems has attempted to develop its own electronic system, but has been unsuccessful.

Thus, there is a tremendous need for an electronic locker system that is reliable, easy to use and cost effective for operators and users alike.

SUMMARY OF THE INVENTION

In accordance with certain preferred embodiments of the present invention, an electronic locking system includes a plurality of lockable storage enclosures, and a controller, such as a microprocessor-based controller, in communication with the plurality of lockable storage enclosures for controlling locking and unlocking of the storage enclosures. The electronic locking system may also include a biometric sensor in communication with the controller for sensing one or more identifying characteristics for multiple users. The controller is adapted to store the one or more identifying characteristics for each user in a memory device. For each user, the controller creates a link between the stored identifying characteristics for the user and one of the lockable storage enclosures. In certain preferred embodiments, the biometric sensor preferably measures the electrical capacitance of ridges and valleys comprising the fingerprint of a user. The electrical capacitance of the ridges and valleys of the fingerprint is then used to generate a unique biometric key that may be associated with the user. The unique key associated with each user is then stored in the memory device. The system may also use other forms of authentication such as an eye scan, magnetic cards, smart cards, PIN codes, bar codes and chips embedded in the human body.

In other preferred embodiments of the present invention, a method of assigning biometric markers to a plurality of lockable storage enclosures includes providing a controller, such as a microprocessor-based controller, in communication with a plurality of lockable storage enclosures, the controller being associated with a memory device for storing information. The method includes sensing one or more biometric markers for one or more users, storing the sensed one or more biometric markers for each of the users in the memory device and linking the sensed one or more biometric markers for each of the users with one of the storage enclosures.

Although the present invention is not limited by any particular theory of operation, in certain preferred embodiments, the present invention is directed to an electronic system that enables individuals to open and close locks, such as electronic locks on storage lockers or doors, using fingerprints or other authenticating data. In an electronic locker system, an individual's fingerprints are associated with one of the lockers in the system and can only be opened at a later time with the correct fingerprints. Thus, the system ensures that the depositor of an item in a locker is also the recipient. Instead of relying on the pattern of a fingerprint, the present invention utilizes a technology that records the capacitance of the ridges and valleys of an individual's fingertip. These measurements are as unique as the fingerprint itself and change when a person dies, or if their finger has been cut off. Thus, the present invention is an improvement over systems that utilize keys, magnetic cards or PIN codes that can be passed between the depositor and the receiver.

As a result, users of the present invention may not be required to use a key insertible into a lock, as is required with prior art systems. Depositors may still have to deposit a coin or other form of money; however, depositors may lay claim to a locker's contents by merely placing their fingertip on a sensor. The sensor notes the pattern of the individual's fingerprint and records it in a memory device or storage medium that notes the date and time. This information may be stored in a central electronic archive. The system will not unlock the locker until it once again "sees" that fingerprint. When the depositor returns to the locker to collect his or her belongings, they apply their finger to the sensor for scanning and the door will only open if the fingerprint stored in the memory device matches the sensed fingerprint. As noted above, the present invention does not look at the fingerprint pattern as is done in prior art systems, but instead measures the electrical capacitance of the ridges and valleys that make up the pattern of an individual's fingertip. This allows the system to identify whether the person laying claim to the articles stored in a locker really is the person who put the articles there in the first place.

Another advantage of the present invention is that it enables a user to identify the location of his or her stored articles when the user has forgotten his or her locker number. In accordance with certain preferred embodiments of the present invention, users will be able to walk up to a terminal and apply a fingertip. A central computer, which will have recorded the details of all recent users, will note the details of the fingertip, compare the fingertip with its records and then tell the user which locker is theirs. This feature will avoid the time-wasting and demeaning process of trying to open hundreds of lockers in order to identify the right one.

In certain preferred embodiments, the present invention utilizes an intelligent locking device, referred to by the assignee as a SmartLok, having a credit card sized printed circuit board. The intelligent locking device may be substituted wherever keys, barrels and non-intelligent electronic locks have traditionally been used. Unlike other electromechanical or electronic locks, the intelligent locking device of the present invention utilizes a printed circuit board that incorporates a powerful on-board microprocessor. The microprocessor is programmable so that it may be modified to satisfy an operator's particular locking and opening requirements. For example, an operator of a locking system in an airport or train station may have different operating requirements than an operator in a school environment (e.g. the airport operator may want to change money while the school operator may want the system to be free). In certain embodiments, the locking system includes a plurality of intelligent locking devices, the printed circuit board of each intelligent locking device being able to communicate with the printed circuit boards of the other intelligent locking devices and with a central controller, referred to by the assignee as a Customer Service Station (CSS), such as a Microsoft Windows NT supervisory systems. It is contemplated that the present invention may be distributed over a wide geographic area and may be managed locally or remotely. Industry standard communications are supported ranging from UTP interconnect for local infrastructure to high-speed modem and Internet protocols for remote access.

The printed circuit board of each intelligent locking device is preferably a credit card size printed circuit board containing the software necessary to offer the world's first true self-intelligent lock controller. Contained within the printed circuit board of each intelligent locking device is a multi-function processor chip, having both RAM and Flash memory as well as processing power. The chip is programmed to operate a number of onboard devices concerned with the control and monitoring of a motor driven lock mechanism. Specifically, each intelligent locking device preferably includes a solid state motor driver chip, a voltage regulator chip, two sets of gear drive status sensors and a pair of two color LED indicator lamps. The printed circuit board of each intelligent locking device may be programmed to communicate via an onboard network chip down a standard UTP network, back to a controller, such as a personal computer PC based operating on a Windows Operating Platform. Operational data may be downloaded to the printed circuit board of the intelligent locking device which will allow it to operate with the chosen environment independently of all other intelligent locking devices on the same network and independently of the controller. During initial setup, the intelligent locking device is given instructions from the central controller. After initial setup, the intelligent locking device runs independently. The intelligent locking device then communicates with the central controller for additional information and/or authorization as required. The PCB-based intelligent locking device is capable of independent security and monitors the mechanical lock assemblies associated therewith. An unauthorized change of status will cause the printed circuit board of the intelligent locking device to broadcast an alarm state to the controller for further action. Meanwhile, the intelligent locking device will take preventive preset action to protect its one or more secured enclosures.

In other preferred embodiments, the present invention includes an intelligent locking device for selectively locking and unlocking one or more enclosed areas including a housing having a microprocessor for operating the intelligent locking device, at least one bolt slidably mounted to the housing and movable between a retracted position and an extended position, and a mechanical driving mechanism in contact with the slidable bolt for moving the bolt between the retracted and extended positions, the driving mechanism being in communication with the microprocessor for receiving signals for retracting and extending the bolt.

The system may use a Distributed Lock Protocol (SDLP), which is a proprietary protocol designed to operate a Controller Area Network (CAN) merging to 2.0a and 2.0b environment. The protocol is used to communicate locking and programmatic control states and acts between intelligent locking device processes and intelligent locker Customer Service Station (CSS) software processes. The state and act model is embedded within the intelligent locker controller software and CSS CAN DLL routines. The protocol is implemented by these same routines.

SDLP is preferably a message-based protocol with fixed field definitions conforming to the CAN 2.0a specification. The protocol relies on the persistence and model of CAN to provide a reliable transport. The protocol embraces many functions, including setting controller specific parameters, controller state checking functions and an acknowledgment model for operational locking functions.

Controllers and CSS systems are unique arbitration IDS within messages to identify targets for messages. Collisions are detected and a retry model is used to resolve the collision traffic. A message ID is used to indicate the act that needs to be affected. A data component is used to carry controller specific parameters to a controller, such that the controller software may use them to reprogram behaviors in real time. At arbitration ID of zero, a general broadcast is generated that is heard by all active components.

In certain preferred embodiments, up to 2,047 active components or more may cooperate using SDLP. Moreover, up to 64 CSS systems or more and up to 1,983 controllers or more may be active in any one configuration.

These and other preferred embodiments of the present invention will be described in more detail below.

DETAILED DESCRIPTION OF PREFERRED EMBODIMENTS

Figure 1:
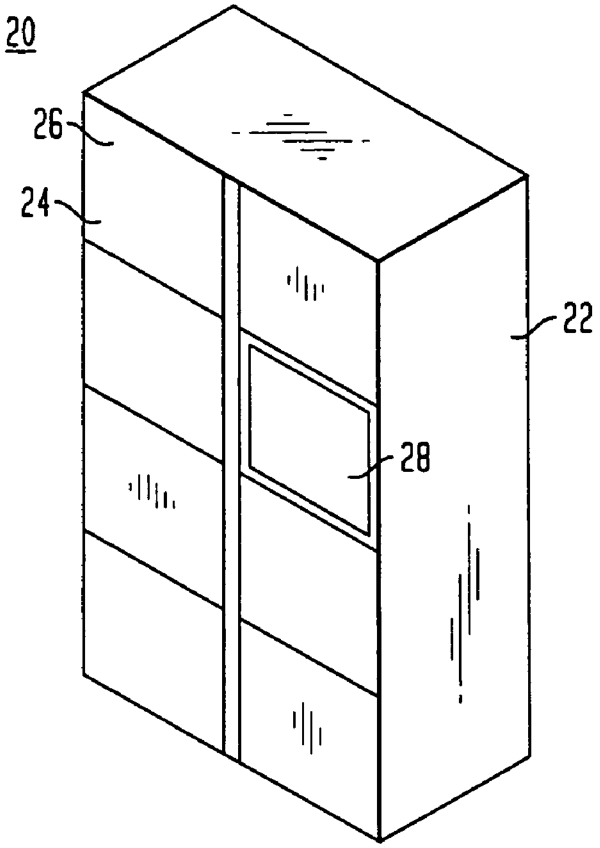
FIG. 1 shows a perspective view of an intelligent locker system, in accordance with certain preferred embodiments of the present invention.

FIG. 1 shows a perspective view of an intelligent locker system, in accordance with certain preferred embodiments of the present invention. The intelligent locker system 20 includes a cabinet 22 having a plurality of locker openings 24. Each opening 24 is covered by a door 26 hingedly connected to the cabinet. The intelligent locker system also includes a central controller, commonly referred to by the assignee as a Customer Service Station (CSS) 28. In the particular embodiment shown in FIG. 1, the intelligent locker system includes two vertically-extending columns of locker openings, each column having a series of vertically aligned openings. In the particular embodiment shown, the locker system has a first column of four locker openings, and a second column of three locker openings and one Customer Service Station. The capacity of the locker system may be increased by adding another locker cabinet 22 to the left or right of that shown in FIG. 1. Thus, additional locker cabinets 22 may be added to the system for increasing overall capacity.

Figure 2:
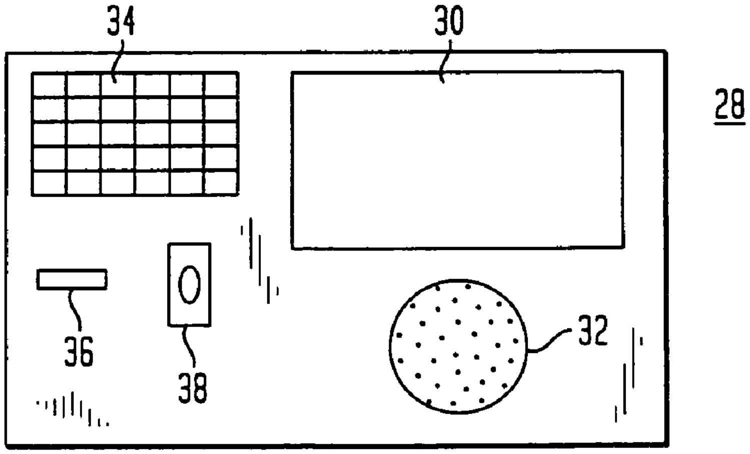
FIG. 2 shows a Customer Service Station used with the intelligent locker system of FIG. 1.

FIG. 2 shows a front view of the Customer Service Station 28 shown in FIG. 1. The Customer Service Station 28 includes a video monitor 30, a speaker 32, and a series of keypads 34 for inputting information into the Customer Service Station 28. The Customer Service Station 28 also includes an opening 36 for receiving money, such as coins or dollar bills. The opening 36 may also be adapted to receive magnetic cards, credit cards, smart cards or any other mode of making payment to the system. The Customer Service Station 28 also preferably includes a biometric scanning device 38 used to scan one or more biometric characteristics of a user. In the particular preferred embodiments shown in FIG. 2, the biometric scanner 38 is used to scan the fingerprint of a user. In other embodiments, the scanner 38 may record other physical characteristics of a user, such as a user's iris. The system may also identify the user by using a PIN code, a smart card, a magnetic card, a bar code or an embedded chip.

Figure 3:
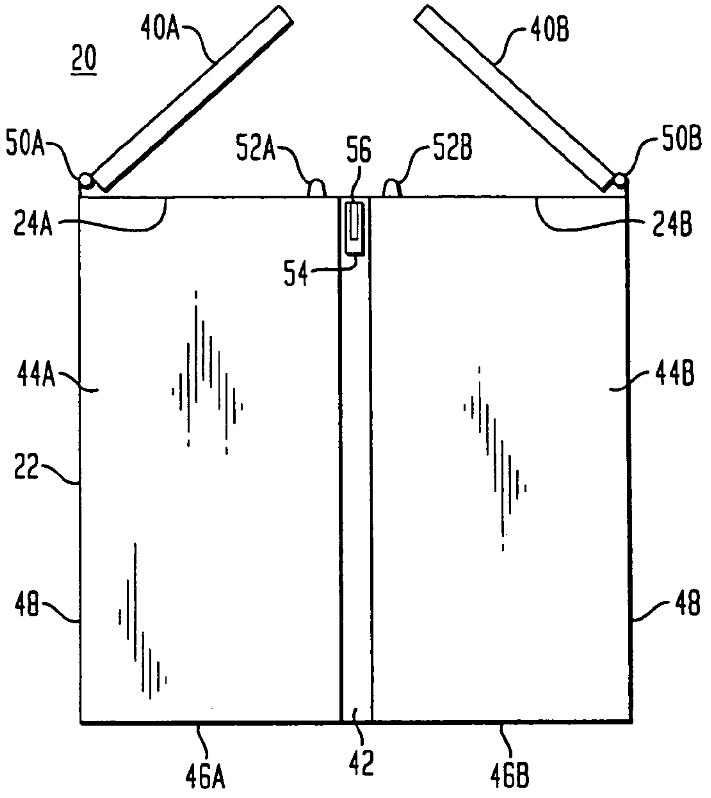
FIG. 3 shows a top view of the intelligent locker system of FIG. 1 including a pair of doors that open in opposite directions.

FIG. 3 shows a top view of the intelligent locker system shown in FIG. 1. At each level of the locker cabinet 22, a set of doors 40A and 40B are hingedly attached to cabinet 22. The doors desirably open away from one another, and preferably selectively cover the cabinet openings 24A and 24B. A central wall 42 extends between each locker opening so as to define distinct locker areas 44A and 44B. Each locker area is defined by central wall 42, a portion of rear wall 46 and a sidewall 48.

As mentioned above, the pair of hingedly connected doors 40A and 40B are designed to open away from one another. First door 40A is hingedly connected to cabinet 22 by hinge 50A. Similarly, second door 40B is hingedly connected to cabinet 22 by hinge 50B. Each door 40A, 40B also may include a resilient or spring element that normally maintains the door in a slightly open position. Thus, a potential user of the intelligent locker system can visually discern whether a particular locker opening is available for use.

A depressible button 52A, 52B is located adjacent each locker opening 24A, 24B. As will be explained in more detail below, when button 52 is depressed, the Customer Service Station 28 is alerted that a user is holding one of the locker doors 40 in a closed position.

The intelligent locker system also includes an intelligent locking device 54 having a printed circuit board 56 with a microprocessor secured therein. The intelligent locking device 54 includes two sets of retractable bolts. The first set of retractable bolts unlocks and locks the door 40A closable over the first locker area 44A and the second set of retractable bolts unlocks and locks the door 40B closable over the second locker area 44B.

Figure 4:
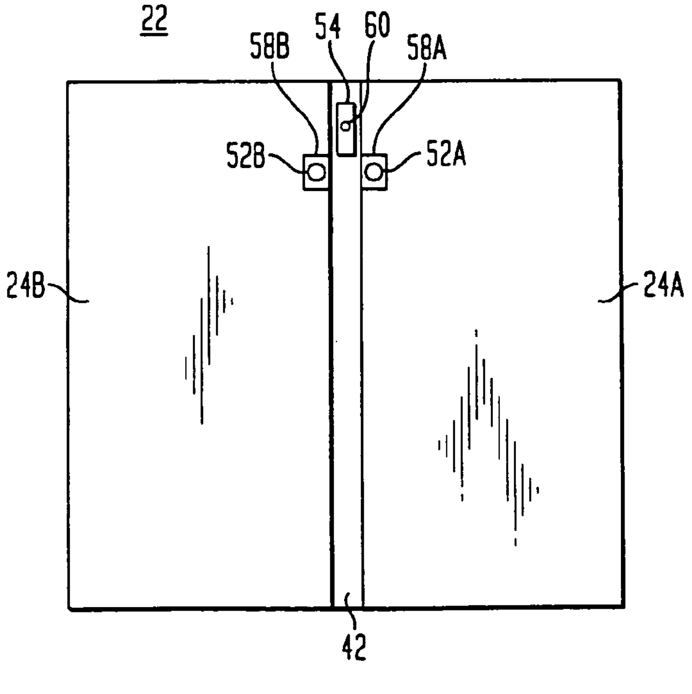
FIG. 4 shows a front fragmentary view of the intelligent locker system of FIG. 1.

FIG. 4 shows a fragmentary front view of the intelligent locker system of the present invention. In particular, FIG. 4 shows one level of the locker cabinet 22 including first locker opening 24A and second locker opening 24B. Adjacent central wall 42, each locker opening has a flange 58A, 58B for supporting depressible buttons 52A and 52B. The intelligent locker system includes intelligent locking device 54 secured inside central wall 42. The intelligent locking device includes a light emitting element 60 that is preferably exposed at the front surface of the locker cabinet 22. In certain preferred embodiments, the light emitting element 60 is a two-color LED that informs users of the intelligent locker system whether a locker is unlocked, locked, or in the process of being unlocked or locked. In one particular preferred embodiment, when locker space 24 is available for use, the light emitting element 60 emits green light. However, when a user places articles within the space 24 and closes the door (not shown), the light emitting element 60 will emit a red light that flashes on and off. The red light will continue to flash until the user has deposited money into the Customer Service Station 28 and entered the required authenticating information (e.g., biometric, PIN code) into the system. Once the user has entered the necessary information at the Customer Service Station 28, the intelligent locking device 54 will lock the door and the light emitting element 60 will emit a solid red light, indicating that the door covering the locker space 24 is locked. The LED 60 will continue to emit a solid red light until the authorized user interacts with the Customer Service Station 28 to unlock the door. At that time, the light emitting element 60 will emit green light.

Figure 5:
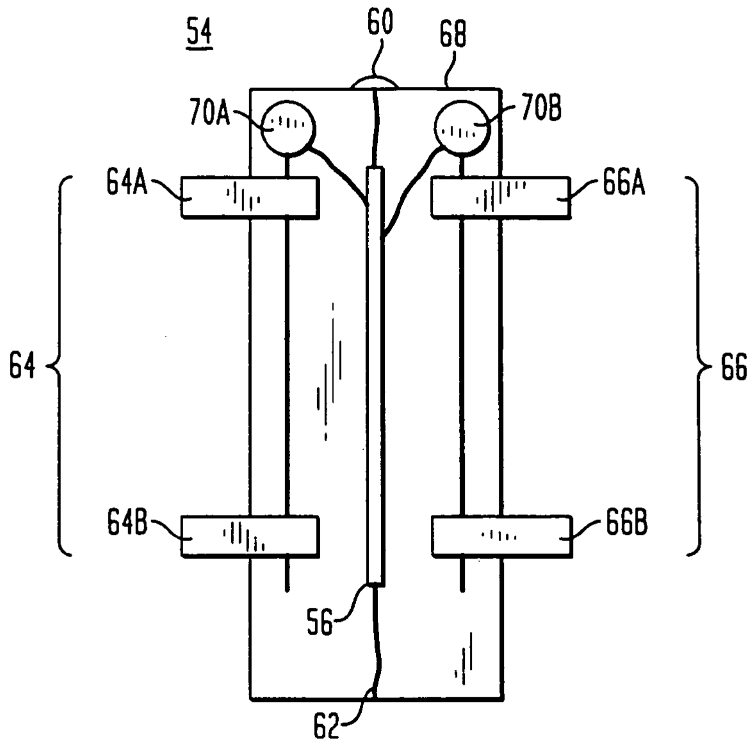
FIG. 5 shows a top cross-sectional view of an intelligent locking device, in accordance with certain preferred embodiments of the present invention.

FIG. 5 shows a top, cross-sectional view of an intelligent locking device 54, in accordance with certain preferred embodiments of the present invention. The intelligent locking device includes a smart card 56 with a microprocessor that controls operation of the device. The smart card 56 has at least one communication line 62 attached thereto for sending and receiving information related to opening and closing locker doors. The smart card 56 preferably has a program stored therein for operating the intelligent locking device. The intelligent locking device includes a first set of retractable bolts 64, including forward bolt 64A and rear bolt 64B, and a second set of retractable bolts 66, including forward bolt 66A and rear bolt 66B. A front wall 68 of the intelligent locking device 54 includes the light emitting element 60. As mentioned above, light emitting element 60 is capable of emitting various colors of light, such as green, amber and red for indicating the locked/unlocked status of the locker. The light emitting element may provide a solid stream of light or may blink on and off. The intelligent locking device 54 also preferably includes a first motor and associated driver 70A for opening and closing the first set of retractable bolts 64, and a second motor 70B and associated driver for opening and closing the second set of retractable bolts 66. The light emitting element 60, and the first and second motor 70A and 70B are preferably in communication with smart card 56.

Figure 6:
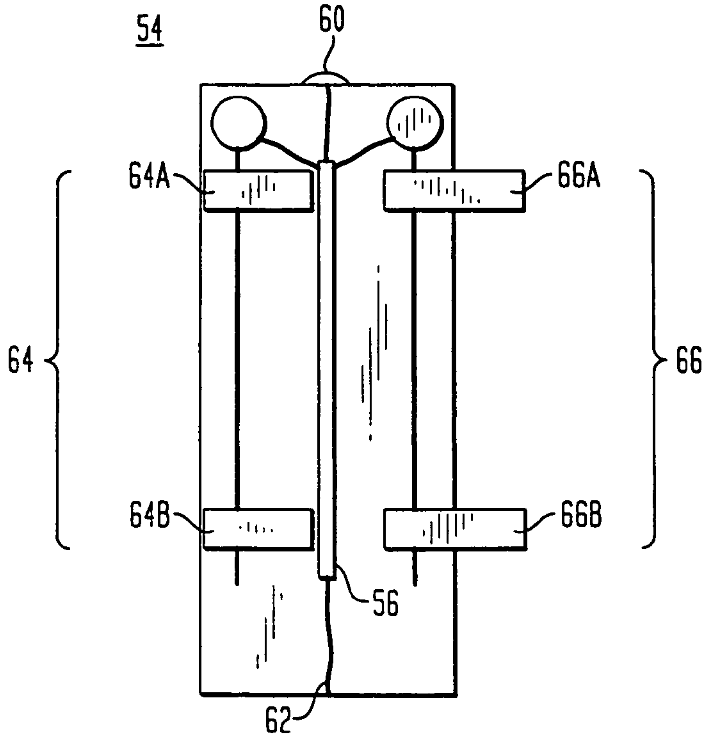
FIG. 6 shows the intelligent locking device of FIG. 5 with a first set of locking bolts in an open position and a second set of locking bolts in a closed position.

The first and second sets of bolts 64, 66 are preferably independent from one another. In other words, one set of bolts may be in the retracted or unlocked position while the other set of bolts may be in the extended or locked position. Moreover, both sets of bolts may simultaneously be in the unlocked position or the locked position. In the particular embodiment shown in FIG. 6, the first set of bolts 64 are retracted in the unlocked position, while the second set of bolts 66 are in the extended, locked position. The unlocked/locked status of the bolts 64, 66, is at all times relayed to smart card 56 which in turn relays the information to the Customer Service Station (not shown) via communication line 62. As a result, the Customer Service Station is able to monitor the status of each locker opening. This information may be compiled by the Customer Service Station and transmitted to a central location via a wide variety of communication channels, such as telephone lines. As a result, the operation of a plurality of intelligent locker systems at a plurality of different locations may be monitored at one central location.

Figure 7:
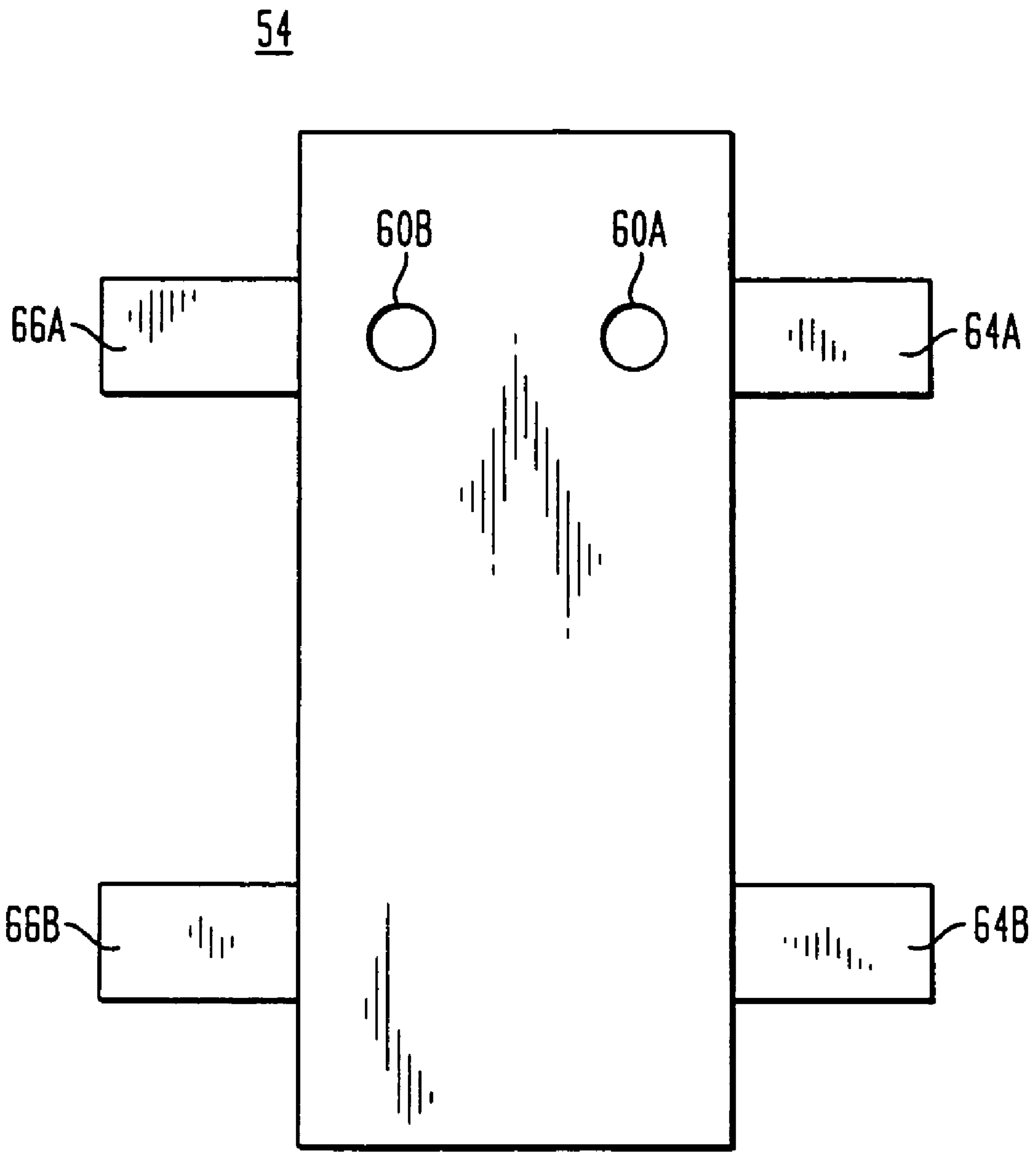
FIG. 7 shows a front view of the intelligent locking device of FIGS. 5 and 6.

FIG. 7 shows a front view of intelligent locking device 54, including a first light emitting element 60A linked with the position of the first set of retractable bolts 64 and a second light emitting element 60B linked with the position of the second set of retractable bolts 66. Thus, the first LED 60A shows the lock/unlock status of the first set of bolts 64 while the second LED 60B shows the lock/unlock status of the second set of bolts 66.

Figure 8:
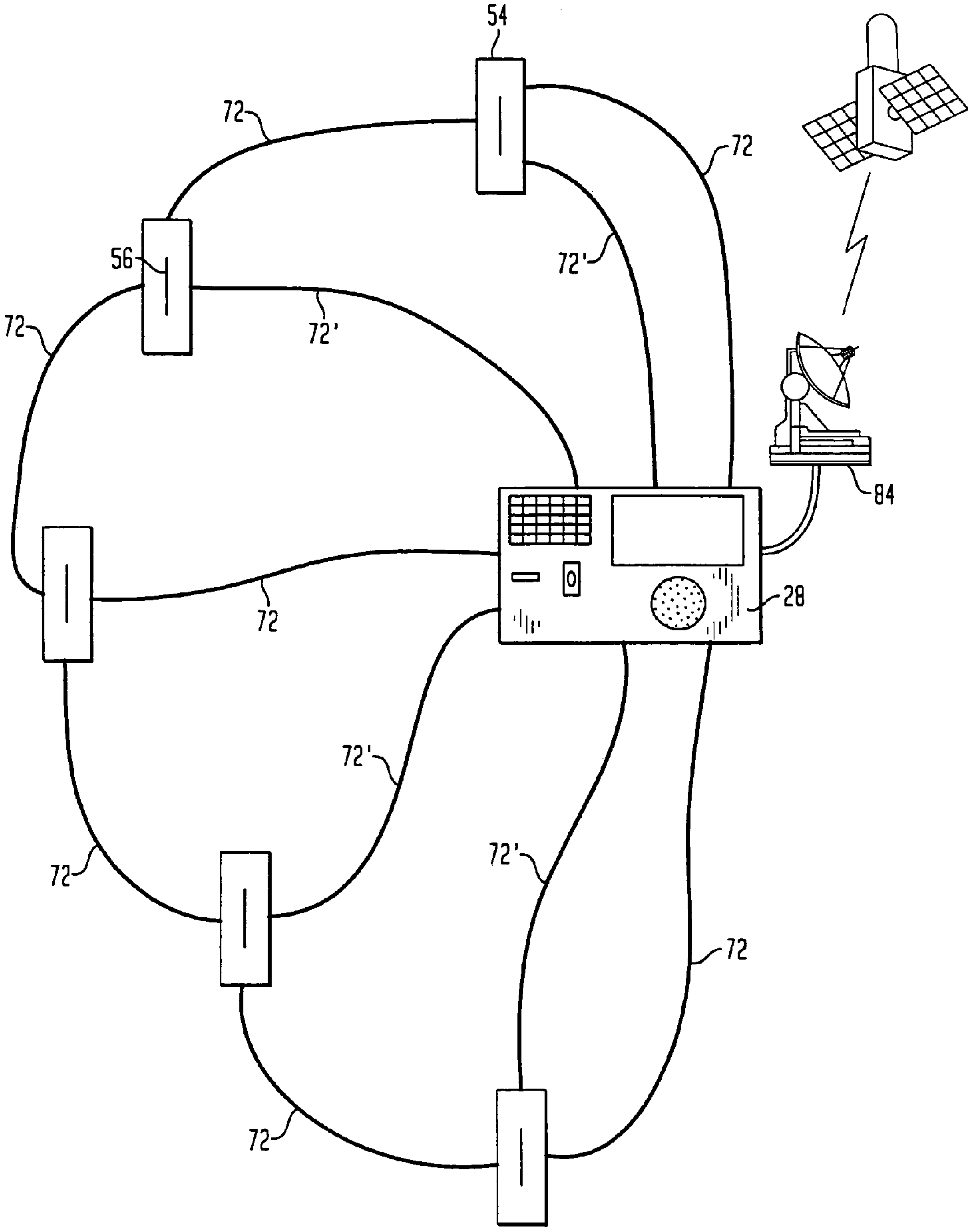
FIG. 8 shows a schematic view of a local area network wherein a plurality of intelligent locking devices are in communication with a central controller.

FIG. 8 shows a local area network (LAN) 72 used to interconnect the plurality of intelligent locking devices 54 with the central controller or Customer Service Station 28. The intelligent locking devices 54 may be connected in series with one another and with the Customer Service Station 28 via a first network line 72. The intelligent locking devices 54 may also be connected in parallel with the Customer Service Station 28 via communication lines 72'. In other preferred embodiments, fiber optic cables may replace the communications lines 72, 72'. In still other embodiments, the intelligent locking devices 54 may communicate with the Customer Service Station 28 via radio waves.

Using the local area network shown in FIG. 8, the Customer Service Station 28 for each intelligent locker system is able to monitor the status of each intelligent locking device 54. The particular status for each intelligent locking device 54 is preferably compiled by the printed circuit board 56 disposed therein. This information is then periodically sent via communication lines 72 to the Customer Service Station 28. The Customer Service Station 28 preferably stores this information in a memory device (not shown). The information may be sent to a central location that compiles information from many different locations. The information may be transmitted via an uplink 84. The transmitted information may include the amount of money collected, the percentage of lockers in use, and whether any of the lockers require maintenance.

Referring to FIGS. 1-11, in operation a user will approach a particular locker opening 24B in order to store one or more articles in locker space 44B. As mentioned above, in its normal position, door 40B is preferably slightly ajar. Door 40B includes one or more openings or recesses 74 adapted to receive one of the retractable bolts 64, 66 when the retractable bolts are extended.

Figure 9:
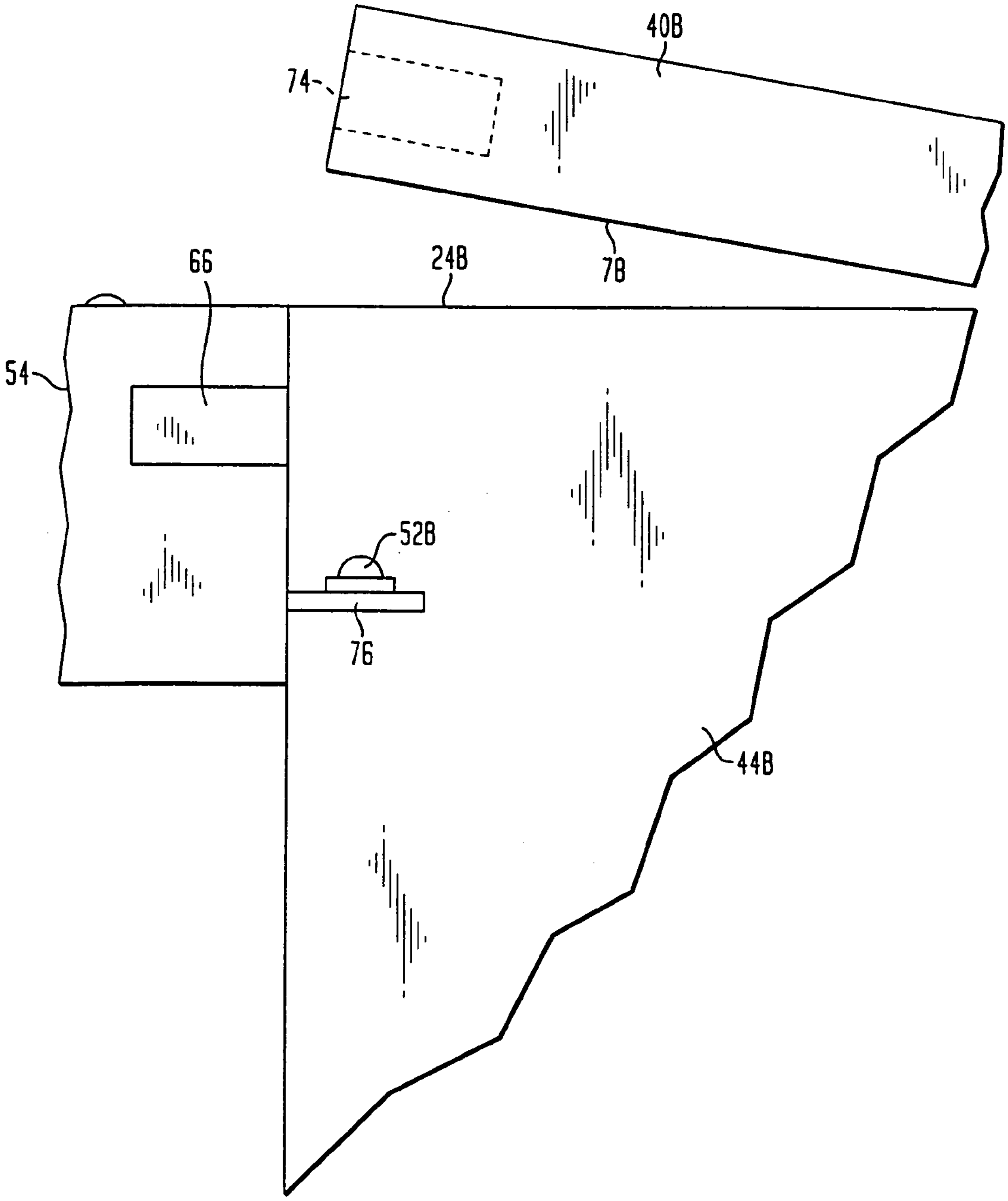
FIG. 9 shows a fragmentary view of the intelligent locker system of FIG. 1 with a door in an open position.

The intelligent locking device 54 shown in FIG. 9 is a simplified view of the system does not show the printed circuit board and the motor and driving mechanism for opening and closing retractable bolt 66. Adjacent locker opening 24B, depressible button 52B is held by flange 76. Depressible button 52 is movable between an extended position and a depressed position. When door 40B is closed, inner surface 78 of door 40B abuts against depressible button 52B so as to depress the button. Upon being depressed, a signal is sent to the printed circuit board of the intelligent locking device 54, thereby informing the printed circuit board that the door 40B of locker opening 24*b* has been closed.

Figure 10:
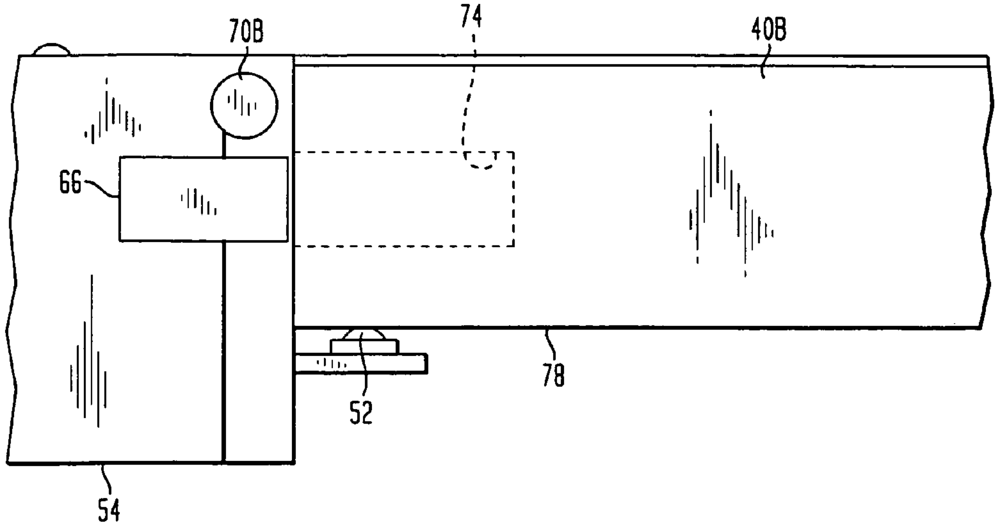
FIG. 10 shows the intelligent locker system of FIG. 9 after the door has been closed, but with the locking bolt still in an open position.

FIG. 10 shows a fragmentary view of the locker immediately after door 40B has been, closed and button 52 has been depressed, but before retractable bolt 66 has move into the extended position for locking the door 40B. When door 40B is initially closed, inner surface 78 of door 40B depresses button 52B, thereby sending a signal to the printed circuit board of the intelligent locking device 54, the signal indicating that door 40B has been closed. After a predetermined period of time, such as approximately 2-10 seconds, the printed circuit board will send a signal to the motor 70B to move the bolt 66 into the extended, locking position.

Figure 11:
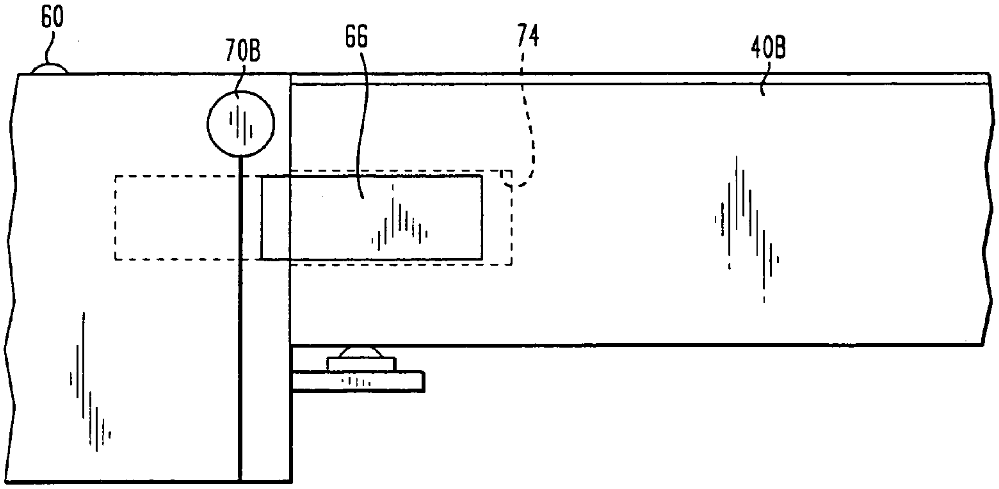
FIG. 11 shows the intelligent locker system of FIG. 10 with the bolt in the closed position for locking the door in the closed position.

Referring to FIG. 11, as motor 70B moves bolt 66 into the extended, locking position, bolt 66 slides into recess 74 formed in the edge of door 40B. Once the bolt 66 extends completely into the locked position, light emitting element 60 emits a solid red light, thereby providing a visual indicator that door 40B has been locked.

Referring to FIGS. 1-11, in other preferred embodiments of the present invention, a user of the intelligent locker system 20 will approach cabinet 22. The user will observe whether one of the locker openings 24 is available for use. The user will then open the door 40 of the locker opening 24 and place articles for storage within the locker area 44. A user may also confirm that a locker is open and available for use by referring to one of the light emitting elements of the intelligent locking device 54. If the light emitting element is a particular color, such as green, the color provides a visual indication that the locker is available. Each locker opening 24 preferably has its own light emitting element 60 assigned thereto. In other preferred embodiments, each locker has two or more light emitting elements 60.

After the user places the articles within the locker opening 24, the user will close the door 40 so as to depress depressible button 52. Upon being depressed, a signal will be sent to the printed circuit board 56 of the intelligent locking device 54 that the locker door 40 is being held in a closed position. After approximately 2-10 seconds, the printed circuit board 56 will send a signal to motor 70 to move retractable bolts 64 into the extended, locking position. As the retractable bolts move into the locking position, the bolts will slide into the recess 74 formed at the edge of door 40. At the same time, light emitting element 60 will change from emitting a solid green light to a flashing amber or red light. The printed circuit board 56 will then send a communication to the Customer Service Station 28 that the particular door has been closed.

The user will then proceed to the Customer Service Station 28 shown in FIG. 2. The Customer Service Station will ask the user which language the user prefers. The user will then touch the video screen 30 or enter information into the system using keys 34. During the initial transaction, the Customer Service Station may ask the user how long he or she desires to use the locker space. The Customer Service Station will then calculate how much the user owes. This amount may be deposited in the form of coins or bills through slot 36. Slot 36 may also be adapted to receive credit cards, magnetic cards, smart cards or any other form of payment. The user will then submit biometric data or other authenticating data to the system. In one particular preferred embodiment, the user places a fingerprint over the biometric sensor 38. The sensor 38 will then scan the fingertip pattern and record it within a memory device. Once the initial transaction is complete, the extendable bolt of the intelligent locking device will remain in the locked position and the light emitting element 60 will transform from emitting a blinking red light to a solid red color.

Later, when the user desires to remove the stored articles from the locker, the user will approach the Customer Service Station 28. The user will place his or her fingerprint over the biometric scanner 38 so that the scanner may obtain a copy of the user's fingerprint. In highly preferred embodiments, the fingerprint data includes information related to the electrical capacitance of the ridges and valleys of the fingerprint. The scanned fingerprint will then be compared with the fingerprint stored in the memory of the Customer Service Station. The processor of the Customer Service Station will associate the retrieved fingerprint with a particular locker number for that fingerprint. Once a link or association has been made between the retrieved fingerprint and the locker associated therewith, the bolts of the intelligent locking device for that particular locker will retract, thereby unlocking the locker door 40. At that time, the light emitting element 60 will change from emitting a solid red light to a solid green light. Once the bolt(s) retract, the locker door 40 will return to its normally partially ajar orientation. The user may than proceed to the locker opening to remove the articles stored in the locker.

Although the above described embodiment utilizes a biometric scanner to obtain fingerprints, it is contemplated that other forms of identification may be used for opening and closing the lockers. For example, the biometric sensor 38 may scan another characteristic of a user's body, such as scanning a user's eye or other distinguishing feature of the body. The Customer Service Station may also utilize PIN codes, magnetic cards, embedded chips or other means for authenticating users.

Shown below are tables that detail message type and exchanges that form the implementation of the protocol.

TABLE 1

Broadcast

| ArbID | Message ID | Data | Comment |
|---|---|---|---|
| 0 | SET_ID (15) | New Controller ID | Controller will use as Arbitration ID after receipt of message. |
| 0 | WAKE_UP (14) | | |

TABLE 2

Programmatic

| ArbID | Message ID | Data | Comment |
|---|---|---|---|
| 64-2046 | HARD_RESET (6) | — | |
| 64-2046 | SOFT_RESET (8) | — | |
| 64-2046 | ENABLE (7) | State* | |
| 64-2046 | SET-STATE (10) | State* | |
| 64-2046 | DISABLE (11) | — | |
| 64-2046 | SET_PARK_OPEN (15) | Ticks | Set motor parking time in 1/50 sec |
| 64-2046 | SET_PARK_CLOSE (16) | Ticks | Set motor parking time in 1/50 sec |
| 64-2046 | SET_DOOR_TICKS (18) | Ticks | Set switch sensitivity in 1/50 sec |

*Locker States
(0) LOCKER_OPEN_AVAILABLE
(1) LOCKER_CLOSED
(2) LOCKER_SETUP
(3) LOCKER_SETUP_REQ_ID
(4) LOCKER_LOCKED
(5) LOCKER_OPEN_FAIL
(6) LOCKER_CLOSE_FAIL
(7) LOCKER_RESET
(8) LOCKER_GET_STATE
(9) LOCKER_REQ_STATE
(11) LOCKER_WAITFOR_SET

TABLE 3

Locking

| ArbID | Message ID | Data | Comment |
|---|---|---|---|
| 64-2046 | CONFIRM_LOCK (2) | — | |
| 64-2046 | OPEN (5) | — | |

TABLE 4

| Operational | | | |
|---|---|---|---|
| ArbID | Message ID | Data | Comment |
| 64-2046 | CLOSED (1) | — | Door has been closed and locks driven. |
| 64-2046 | CLOSED_FAIL (2) | — | Failure to complete a lock drive after door closed. |
| 64-2046 | OPEN-FAIL (3) | — | Failure to complete a lock drive after open message rcvd. |
| 64-2046 | REQ-STATE (4) | — | Sent after wake-up rcvd if Controller has ID. |
| 64-2046 | LOCKER_OPENED (10) | — | Sent after successful open. |
| 64-2046 | LOCKER_LOCKED (11) | — | Sent as confirmed receipt of CONFIRM_LOCK msg. |

TABLE 5

| Security | | | |
|---|---|---|---|
| ArbID | Message ID | Data | Comment |
| 64-2046 | TAMPER_DOOR (5) | — | Door switch is open and should be closed. |
| 64-2046 | TAMPER_LOCK (7) | — | Lock open when should be closed. |

TABLE 6

| Acknowledgement | | | |
|---|---|---|---|
| ArbID | Message ID | Data | Comment |
| 64-2046 | CLOSED_FAIL (2) | — | Failure to complete a lock drive after door closed. |
| 64-2046 | OPEN_FAIL (3) | — | Failure to complete a lock drive after open message rcvd. |
| 64-2046 | LOCKER_OPENED(10) | — | Sent after successful open. |
| 64-2046 | LOCKER_LOCKED (11) | — | Sent as confirmed receipt of CONFIRM_LOCK msg. |

TABLE 7

| Diagnostic | | | |
|---|---|---|---|
| ArbID | Message ID | Data | Comment |
| 64-2046 | PING (17) | — | Check if controller exists |
| 64-2046 | PONG (8) | State* | Response to PING msg. |

*Locker States
(0) LOCKER_OPEN_AVAILABLE
(1) LOCKER_CLOSED
(2) LOCKER_SETUP
(3) LOCKER_SETUP_REQ_ID
(4) LOCKER_LOCKED
(5) LOCKER_OPEN_FAIL
(6) LOCKER_CLOSE_FAIL
(7) LOCKER_RESET
(8) LOCKER_GET_STATE
(9) LOCKER_REQ_STATE
(11) LOCKER_WAITFOR_SET Although the present invention has been described with reference to particular preferred embodiments, it is to be understood that the embodiments are merely illustrative of the principles and application of the present invention. For example, the system can be used for any type of enclosable space, such as a room or closet. The system may also be used in any type of environment where enclosed spaces must be locked and unlocked, such as offices, hotel rooms, storage facilities, post office boxes and the like. It is therefore to be understood that numerous modifications may be made to the preferred embodiments and that other arrangements may be devised without departing from the spirit and scope of the present invention as defined by the claims.

The invention claimed is:

1. A method of using an electronic locking system to access one of a plurality of lockers, the method comprising:

programming said electronic locking system by recording at least one biometric characteristic of a user when said user is located at said plurality of lockers;

associating said recorded at least one biometric characteristic of said user with said one of a plurality of lockers;

re-recording said at least one biometric characteristic of said user and comparing said re-recorded at least one biometric characteristic of said user with said recorded at least one biometric characteristic of said user; and unlocking said one of a plurality of lockers if said re-recorded at least one biometric characteristic of said user matches said recorded at least one biometric characteristic of said user.

2. The method as claimed in claim 1, wherein said at least one biometric characteristic comprises at least one fingerprint.

3. The method as claimed in claim 2, wherein said at least one fingerprint comprises a fingerprint pattern.

4. The method as claimed in claim 2, wherein said at least one fingerprint comprises information related to the electrical capacitance of ridges and valleys of said at least one fingerprint.

5. The method as claimed in claim 1, wherein said one of a plurality of lockers is locked before the re-recording said at least one biometric characteristic step.

6. The method as claimed in claim 1, further comprising selecting a language for use during one or more steps of the method.

7. The method as claimed in claim 1, further comprising making a monetary payment for using said one of a plurality of lockers.

8. The method as claimed in claim 1, further comprising:

selecting a length of time for using said one of a plurality of lockers;

making a monetary payment having an amount that is related to the selected length of time.

9. The method as claimed in claim 8, wherein said user is authorized to repeatedly lock and unlock said one of a plurality of lockers during the selected length of time.

10. The method as claimed in claim 1, further comprising re-programming said electronic locking system using at least one biometric characteristic of a second user when said second user is located at said plurality of lockers so that said at least one biometric characteristic of said second user is associated with said one of a plurality of lockers and so that said second user is authorized to access said one of a plurality of lockers and said first user is no longer authorized to access said one of a plurality of lockers.

11. A method of controlling access to one of a plurality of lockers using an electronic locking system comprising:

programming said electronic locking system by recording at least one biometric characteristic of a user when said user is located at said plurality of lockers;

associating said recorded at least one biometric characteristic with said one of a plurality of lockers so that only said user is authorized to access said one of a plurality of lockers;

after the programming step, using said at least one biometric characteristic of said user for unlocking said one of a plurality of lockers.

12. The method as claimed in claim 11, wherein said at least one biometric characteristic comprises at least one fingerprint.

13. The method as claimed in claim 12, wherein said at least one fingerprint comprises a fingerprint pattern.

14. The method as claimed in claim 12, wherein said at least one fingerprint comprises information related to the electrical capacitance of ridges and valleys of said at least one fingerprint.

15. The method as claimed in claim 11, wherein said one of a plurality of lockers is locked before the re-recording said at least one biometric characteristic step.

16. The method as claimed in claim 11, further comprising selecting a language for use during one or more steps of the method.

17. The method as claimed in claim 11, further comprising making a monetary payment for using said one of a plurality of lockers.

18. The method as claimed in claim 11, further comprising:

selecting a length of time for using said one of a plurality of lockers;

making a monetary payment having an amount that is related to the selected length of time.

19. The method as claimed in claim 11, further comprising re-programming said electronic locking system by newly recording at least one biometric characteristic of a second user when said second user is located at said plurality of lockers and associating said newly recorded at least one biometric characteristic with said one of a plurality of lockers so that only said second user is authorized to access said one of a plurality of lockers and so that said first user is no longer authorized to access said one of a plurality of lockers.

20. A method of controlling access to one of a plurality of lockers using an electronic locking system comprising:

recording and associating a biometric characteristic of a user with one of said plurality of lockers when said user is located at said plurality of lockers, thereby permitting only said user to open said one of a plurality of lockers, re-recording said biometric characteristic of said user; and unlocking said one of a plurality of lockers if the re-recorded said biometric characteristic of said user matches the recorded said biometric characteristic of said user.

21. The method as claimed in claim 20, further comprising re-programming said system by newly recording a biometric characteristic of a second user when said second user is located at said plurality of lockers and associating said newly recorded biometric characteristic with said one of a plurality of lockers, thereby permitting only said second user to open said one of a plurality of lockers.

22. The method as claimed in claim 20, wherein said at least one biometric characteristic comprises at least one fingerprint.

23. The method as claimed in claim 22, wherein said at least one fingerprint comprises a fingerprint pattern.

24. The method as claimed in claim 22, wherein said at least one fingerprint comprises information related to the electrical capacitance of ridges and valleys of said at least one fingerprint.

* * * * *